US012770350B2

(12) United States Patent
Park et al.

(10) Patent No.: US 12,770,350 B2
(45) Date of Patent: Oct. 20, 2026

(54) METHOD AND SERVER FOR MATCHING POINT GROUPS IN THREE-DIMENSIONAL SPACE

(71) Applicant: SEOUL ROBOTICS CO., LTD., Seoul (KR)

(72) Inventors: Jaeil Park, Seoul (KR); Hong Minh Truong, Suwon-si (KR); Young Seong Kim, Seoul (KR); Seong Ju Kang, Seoul (KR)

(73) Assignee: Seoul Robotics Co., LTD., Seoul (KR)

( * ) Notice: Subject to any disclaimer, the term of this patent is extended or adjusted under 35 U.S.C. 154(b) by 141 days.

(21) Appl. No.: 18/585,596

(22) Filed: Feb. 23, 2024

(65) Prior Publication Data

US 2024/0193898 A1 Jun. 13, 2024

Related U.S. Application Data

(63) Continuation of application No. PCT/KR2022/012339, filed on Aug. 18, 2022.

(30) Foreign Application Priority Data

Aug. 26, 2021 (KR) ........................ 10-2021-0113405

(51) Int. Cl.
*G06T 19/20* (2011.01)

(52) U.S. Cl.
CPC ...... *G06T 19/20* (2013.01); *G06T 2219/2004* (2013.01); *G06T 2219/2016* (2013.01)

(58) Field of Classification Search
CPC ............. G06T 19/20; G06T 2219/2004; G06T 2219/2016; G06T 2200/32;

(Continued)

(56) References Cited

U.S. PATENT DOCUMENTS 6,701,006 B2 * 3/2004 Moore ................. G06V 10/757 382/294
8,116,558 B2 2/2012 Hayashi et al.

(Continued)

FOREIGN PATENT DOCUMENTS

CN 109033989 B * 11/2020 ............. G06F 18/23
CN 112017225 A * 12/2020 ............... G06T 7/33

(Continued)

OTHER PUBLICATIONS

Robotics Knowledgebase. Registration Techniques in Robotics [Online]. May 11, 2020 [Retrieved on Sep. 3, 2025]. Retrieved from the Internet: <URL: https://roboticsknowledgebase.com/wiki/math/registration-techniques/ > (Year: 2020).*

(Continued)

*Primary Examiner* — King Y Poon
*Assistant Examiner* — Michelle Hau Ma
(74) *Attorney, Agent, or Firm* — Knobbe Martens Olson & Bear LLP

(57) ABSTRACT

Proposed is a server for matching point clouds in a three-dimensional space. The server may include a communication interface configured to obtain point clouds in the three-dimensional space from a plurality of sensing devices, a memory, and a processor. The processor may obtain first reference points belonging to a first point cloud in an overlapping portion between a first point cloud and a second point cloud corresponding to a predetermined reference surface, respectively obtained by adjacent sensing devices among the plurality of sensing devices. The processor may also obtain second reference points corresponding to the obtained first reference points from the second point cloud adjacent to the first point cloud, and match the first point cloud with the second point cloud to minimize an error between a first regression model formed with the obtained (Continued)

first reference points and a second regression model formed with the obtained second reference points.

12 Claims, 12 Drawing Sheets

(58) Field of Classification Search
CPC .......... G06T 2207/10028; G06T 17/00; G06T 7/33; G06T 7/344; G06T 7/11; G06T 7/73
See application file for complete search history.

(56) References Cited

U.S. PATENT DOCUMENTS

| | | | | |
|---|---|---|---|---|
| 9,053,547 | B2 | 6/2015 | Kitamura et al. | |
| 10,628,949 | B2 * | 4/2020 | Aflalo | G06T 3/14 |
| 10,853,687 | B2 | 12/2020 | Yan et al. | |
| 11,423,508 | B2 * | 8/2022 | Zhang | G06T 7/33 |
| 2020/0160559 | A1 | 5/2020 | Urtasun et al. | |
| 2020/0174107 | A1 * | 6/2020 | Briggs | G06T 7/73 |
| 2021/0407188 | A1 * | 12/2021 | Mundy | G06T 17/05 |

FOREIGN PATENT DOCUMENTS

| | | | | |
|---|---|---|---|---|
| DE | 102016116572 | A1 * | 3/2018 | G06T 19/00 |
| JP | 2016-186488 | A | 10/2016 | |
| KR | 10-2019-0073244 | A | 6/2019 | |
| KR | 2019-0082062 | | 7/2019 | |
| KR | 10-2020-0029049 | A | 3/2020 | |
| KR | 10-2021-0003937 | A | 1/2021 | |
| KR | 10-2285530 | B1 | 8/2021 | |
| WO | WO 2007/069724 | A1 | 6/2007 | |
| WO | WO 2019/202397 | A2 | 10/2019 | |
| WO | WO 2019/226686 | A2 | 11/2019 | |

OTHER PUBLICATIONS

Pais et al. 3DRegNet: A Deep Neural Network for 3D Point Registration [Online]. Apr. 7, 2020 [Retrieved on Sep. 4, 2025]. Retrieved from the Internet: <URL: https://arxiv.org/abs/1904.01701 > (Year: 2020).*

Cura et al. A scalable and multi-purpose point cloud server (PCS) for easier and faster point cloud data management and processing [Online]. Jul. 12, 2016 [Retrieved on Jan. 5, 2026]. Retrieved from the Internet: <URL: https://www.sciencedirect.com/science/article/pii/S092427161630123X > (Year: 2016).*

Liu, Yonghuai. Automatic registration of overlapping 3D point clouds using closest points [Online]. Jan. 31, 2006 [Retrieved on Jan. 5, 2026]. Retrieved from the Internet: <URL: https://www.sciencedirect.com/science/article/pii/S0262885606000539 > (Year: 2006).*

User 'mjv'. 'Best database design for a "sensor system". In Stack Overflow [Online]. Oct. 9, 2009; 17:44 [Retrieved on May 28, 2026]. Retrieved from the Internet: <URL: https://stackoverflow.com/questions/1544815/best-database-design-for-a-sensor-system>. (Year: 2009).*

Office Action received in KR Application No. 10-2021-0113405 dated Mar. 5, 2024.

International Search Report and Written Opinion mailed Nov. 24, 2022 in International Application No. PCT/KR2022/012339, in 9 pages. (English translation of ISR.).

Office Action received in corresponding Japanese Patent Application No. 2024-512022 dated Mar. 25, 2025.

Fujimoto et al., "Geometric alignment for large point cloud pairs using sparse overlap areas," SPIE, vol. 7252, pp. 1-9.

Songlin et al., "PLADE: A Plane-Based Descriptor for Point Cloud Registration With Small Overlap," IEE Transactions on Geoscience and Remote Sensing, 2020, vol. 58, No. 4, pp. 2530-2540.

Wu et al., "Registration of Airborne LiDAR Point Clouds by Matching the Linear Plane Features of Building Roof Facets," Remote Sensing, 2016, 8, 447. pp. 1-17.

Extended European Search Report received in corresponding European Patent Application No. 22861630.6 dated Sep. 25, 2025.

* cited by examiner

METHOD AND SERVER FOR MATCHING POINT GROUPS IN THREE-DIMENSIONAL SPACE

CROSS REFERENCE TO RELATED APPLICATIONS

This is a continuation application of International Patent Application No. PCT/KR2022/012339, filed on Aug. 18, 2022, which claims priority to Korean patent application No. 10-2021-0113405 filed on Aug. 26, 2021, contents of each of which are incorporated herein by reference in their entireties.

BACKGROUND

Technical Field

The disclosure relates to a method and server for matching point clouds in a three-dimensional space.

Description of Related Technology

Light detection and ranging (LiDAR) is a technology for obtaining information about a three-dimensional space by emitting light to objects in the three-dimensional space and then receiving reflected light. With the development of sensing technology such as the LiDAR technology, recently, advanced control functions incorporating sensing technology functions have been utilized in various industrial technological fields.

There is a physical limit to the sensing area to be sensed by one sensing device, and thus, a plurality of sensing devices are appropriately arranged in a large area. Information about a large space may be obtained based on data received from a plurality of sensing devices.

SUMMARY

One aspect is a method and server for accurately matching point clouds in a three-dimensional space obtained by a plurality of sensing devices.

Another aspect is a method of matching point clouds in a three-dimensional space includes obtaining point clouds in a three-dimensional space from a plurality of sensing devices, obtaining first reference points belonging to a first point cloud in an overlapping portion between a first point cloud and a second point cloud corresponding to a predetermined reference surface, respectively obtained by sensing devices adjacent to each other from among the plurality of sensing devices, obtaining second reference points corresponding to the obtained first reference points from among the second point cloud adjacent to the first point cloud, and matching the first point cloud with the second point cloud to minimize an error between a first regression model formed with the obtained first reference points and a second regression model formed with the obtained second reference points.

Another aspect is a computer-readable storage medium having stored therein a program to be executed on a computer includes instructions to obtain point clouds in a three-dimensional space from a plurality of sensing devices, instructions to obtain first reference points belonging to a first point cloud in an overlapping portion between a first point cloud and a second point cloud corresponding to a predetermined reference surface, respectively obtained by sensing devices adjacent to each other from among the plurality of sensing devices, instructions to obtain second reference points corresponding to the obtained first reference points from the second point cloud adjacent to the first point cloud, and instructions to match the first point cloud with the second point cloud to minimize an error between a first regression model formed with the obtained first reference points and a second regression model formed with the obtained second reference points.

Another aspect is a server for matching point clouds in a three-dimensional space includes a communication interface configured to obtain point clouds in the three-dimensional space from a plurality of sensing devices, a memory storing one or more instructions, and a processor configured to, by executing the one or more instructions, obtain first reference points belonging to a first point cloud in an overlapping portion between a first point cloud and a second point cloud corresponding to a predetermined reference surface, respectively obtained by sensing devices adjacent to each other from among the plurality of sensing devices, obtain second reference points corresponding to the obtained first reference points from the second point cloud adjacent to the first point cloud, and match the first point cloud with the second point cloud to minimize an error between a first regression model formed with the obtained first reference points and a second regression model formed with the obtained second reference points.

DETAILED DESCRIPTION

Hereinafter, various embodiments are described in detail with reference to the accompanying drawings. In order to describe the features of the embodiments more clearly, detailed descriptions on items that are well-known to a person skilled in the art to which the following embodiments pertain are omitted.

In the description of embodiments, when a constituent element is "connected" to another constituent element, the constituent element contacts or is connected to the other constituent element directly or through at least one of other constituent elements. Furthermore, it will be further understood that the term "comprises" used herein specifies the presence of stated features or components, but does not preclude the presence or addition of one or more other features or components.

Furthermore, in the specification, terms such as "first" and "second" are used herein merely to describe a variety of constituent elements, but the constituent elements are not limited by the terms. It is obvious that the constituent elements are not limited by the terms. The terms are used only for the purpose of distinguishing one constituent element from another constituent element.

The present embodiments relate to a method and server for matching point clouds in a three-dimensional space, and detailed descriptions on items that are well-known to a person skilled in the art to which the following embodiments pertain are omitted.

Figure 1:
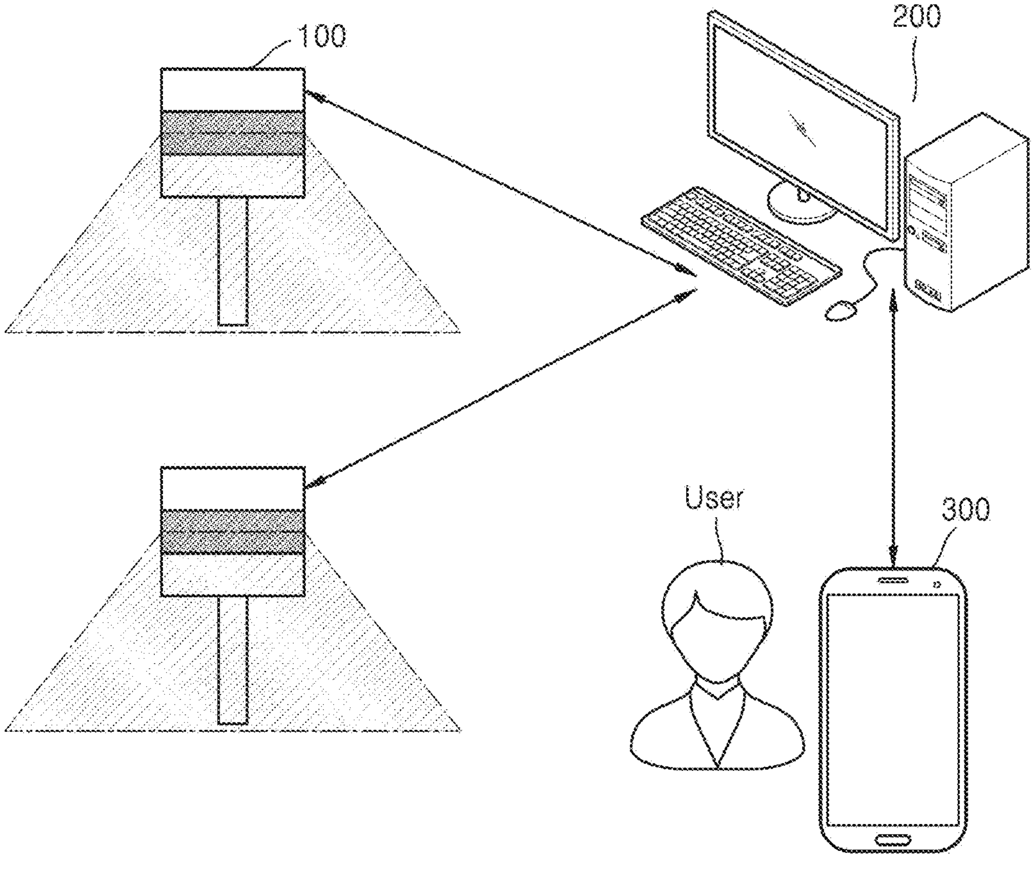
FIG. 1 is a view for explaining a server connected to a plurality of sensing devices.

FIG. 1 is a view for explaining a server 200 connected to a plurality of sensing devices 100.

The sensing device 100 is a device for obtaining a point cloud (point cloud data) as space information about a three-dimensional space and may include at least one sensor. The sensing device 100 may emit light into a three-dimensional space, and obtain a point cloud in the three-dimensional space based on light received in response the emitted light.

The sensing device 100 may be installed indoors or outdoors in a place where a three-dimensional space can be sensed. In order to monitor a large area, the plurality of sensing devices 100 may be installed considering a sensing area according to a range that can be sensed by a sensor of the sensing devices 100. For example, the plurality of sensing devices 100 may be installed at a certain distance from each other.

The sensing device 100 may include a light detection and ranging (LiDAR) sensor as a 3D sensor for sensing a three-dimensional space and may obtain volumetric point cloud data. The sensing device 100 may further include, as necessary, various types of sensors such as radar sensors, infrared image sensors, cameras, and the like. The sensing device 100 may employ a plurality of homogeneous sensors or a combination of heterogeneous sensors, considering the sensing range of each type of a sensor, the type of data to obtain, and the like.

The server 200 may be connected to the plurality of sensing devices 100. The server 200 may obtain point clouds in a three-dimensional space from the plurality of sensing devices 100. The server 200 may provide a predetermined service by utilizing the obtained point clouds in a three-dimensional space. A user may access the server 200 by using a user terminal 300, and may receive a predetermined service provided by the server 200.

To this end, it is important that the server 200 produces one sensing result for the entire three-dimensional space from a point cloud in a three-dimensional space received from each of the plurality of sensing devices 100. For example, when one person passes through an area that is simultaneously sensed by the plurality of sensing devices 100, if the point clouds in a three-dimensional space received from the plurality of sensing devices 100 are not accurately matched with each other, a problem may arise where one person can be perceived as multiple people. A method of accurately matching point clouds in a three-dimensional space obtained from the plurality of sensing devices 100 is described below.

Figure 2:
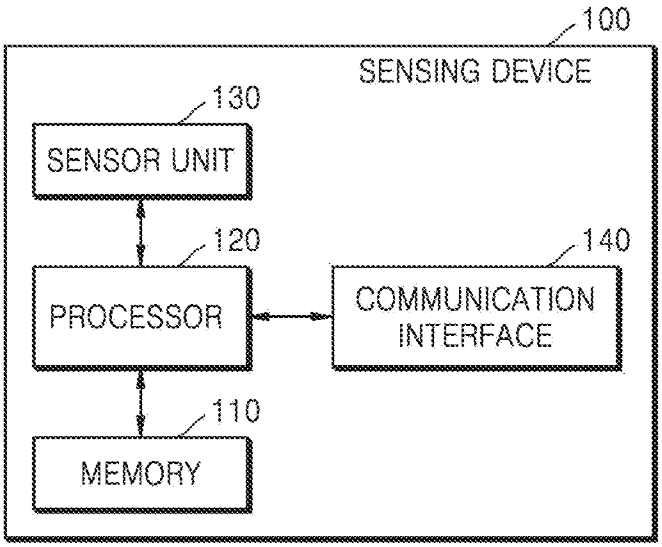
FIG. 2 is a view for explaining a configuration and an operation of a sensing device.

FIG. 2 is a view for explaining the configuration and operation of the sensing devices 100.

Referring to FIG. 2, the sensing devices 100 according to an embodiment may include a memory 110, a processor 120, a sensor unit 130, and a communication interface 140. A person skilled in the art to which the present embodiment pertain can understand that, in addition to the components illustrated in FIG. 2, other general-purpose components may be further included.

The memory 110 may store software and/or a program. The memory 110 may store instructions to be executable by the processor 120.

The processor 120 may access and use the data stored in the memory 110 or store new data in the memory 110. The processor 120 may execute the instructions stored in the memory 110. The processor 120 may execute a computer program installed in the sensing device 100. Furthermore, the processor 120 may store and execute an externally received computer program or application in the memory 110. The processor 120 may perform a predetermined operation by executing at least one processing module. For example, the processor 120 may execute or control a processing module that executes a program for sensing the installation abnormality of the sensing device 100. The processor 120 may control other components included in the sensing device 100 to perform an operation corresponding to a result of the execution of instructions, computer programs, or the like.

The sensor unit 130 may include at least one sensor for sensing a three-dimensional space. The sensor unit 130 may include a light-emitting portion that emits light to a three-dimensional space and a light receiving portion that receives light, and may further include a dedicated processor that obtains the point cloud of a three-dimensional space based on the intensity of the light received by the light receiving portion. To track an object located in a three-dimensional space within a sensing range, the sensor unit 130 may obtain point clouds in a three-dimensional space. The sensor unit 130 may be a LiDAR sensor, and may include at least one three-dimensional LiDAR sensor to obtain data of a space in a predetermined range. The sensor unit 130 may further include various types of sensors, such as a radar sensor, an infrared image sensor, an ultrasound sensor, and the like, according to an environment.

The communication interface 140 may perform wired/wireless communication with other devices or networks. To this end, the communication interface 140 may include a communication module that supports at least one of various wired/wireless communication methods. For example, short-range communication, such as radio frequency identification (RFID), near field communication (NFC), or Bluetooth™ various types of wireless communication, or wired communication using a coaxial cable, an optical cable, and the like. The communication interface 140 may be connected to a device located outside the sensing device 100 to transceive signals or data. The sensing device 100 may communicate with a terminal device of a manager through the communication interface 140. For example, the sensing device 100 may be connected to an external server 200 that provides a predetermined service by using the point clouds in a three-dimensional space through the communication interface 140.

The sensing devices 100 may further include a positional sensor such as a GPS, in addition to the above components, and may further include components to improve sensing performance according to an installation environment of the sensing devices 100.

The processor 120 according to an embodiment configured as above may operate the sensor unit 130, by executing the one or more instructions stored in the memory 110, to obtain a point cloud in a three-dimensional space, and may transmit the point cloud in a three-dimensional space to the server 200 through the communication interface 140. The sensing devices 100 may transmit information for identifying the sensing devices 100 with the point cloud in a three-dimensional space.

Figure 3:
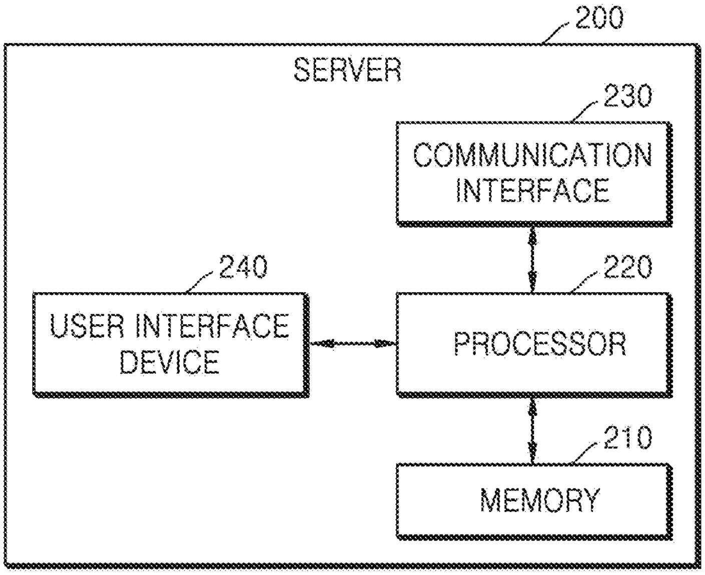
FIG. 3 is a view for explaining a configuration and an operation of a server.

FIG. 3 is a view for explaining the configuration and operation of the server 200.

The server 200 may detect an object in a three-dimensional space based on a point cloud in the three-dimensional space, and perform a series of processing of monitoring the three-dimensional space. To this end, the server 200 may receive a point cloud in a three-dimensional space obtained by each of the sensing devices 100 from the plurality of sensing devices 100, and may perform a process of matching point clouds in a three-dimensional space according to the present disclosure. The server 200 may be implemented by a technology such as cloud computing. The server 200 may perform high speed data communication with the sensing devices 100. The server 200 is not limited by the name thereof, and may be substituted by a computing device, an operator, a console device, and the like.

Referring to FIG. 3, the server 200 may include a memory 210, a processor 220, a communication interface 230, and a user interface device 240. Anyone skilled in the art related to the present embodiment will know that other general-purpose components may be included in addition to the components illustrated in FIG. 3.

Each component of the block diagram of FIG. 3 may be separated, added, or omitted according to the implementation method of the server 200. In other words, depending on the implementation method, one component may be subdivided into two or more components, two or more components may be combined into one component, or some components may be added or removed. The server 200 may be configured with a plurality of devices that are physically divided, or may be provided as one integrated form.

The memory 210 may store instructions executable by the processor 220. The memory 210 may store a software or program.

The processor 220 may execute the instructions stored in the memory 210. The processor 220 may perform the overall control of the server 200. The processor 220 may obtain information and requests received through the communication interface 230 and store the received information in a storage (not shown). Furthermore, the processor 220 may process the received information. For example, the processor 220 may obtain information used to provide a predetermined service by using the point cloud in a three-dimensional space information received from the sensing devices 100.

Furthermore, the processor 220 may transmit, in response to a request obtained from a manager's terminal, information corresponding to the request to the manager's terminal, through the communication interface 230, by using data or information stored in the storage.

The communication interface 230 may perform wired/wireless communication with other devices or networks. The communication interface 230 may be connected to a device located outside the server 200 to transceive signals or data. The server 200 may communicate with the sensing device 100 through the communication interface 230, or may be connected to another server connected via a network.

The user interface device 240 may include an input portion for receiving in input from a user and an output portion for providing information. The input portion may receive various types of inputs from the user. The output portion may include a display panel and a controller for controlling the display panel, and may be implemented in various manner, such as a liquid crystal display (LCD), an organic light-emitting diode (OLED) display, an active-matrix organic light-emitting diode (AM-OLED), a plasma display panel (PDP), and the like.

The user interface device 240, as illustrated in FIG. 3, may be included in the server 200, but the disclosure is not limited thereto. A service provider or manager who provides a service through the server 200 may access the server 200 by using a separate terminal, and may transmit an input to the server 200 or receive an output from the server 200, through the terminal.

The storage may store various pieces of software and information needed for the server 200 to control the device or provide a predetermined service. For example, the storage may store a program executed on the server 200, an application, and various pieces of data or information used for a predetermined service.

According to the configuration described above, the server 200 may obtain point clouds in a three-dimensional space from the sensing devices 100 through the communication interface 230. The server 200 may obtain point clouds in a three-dimensional space from the plurality of sensing devices 100. To distinguish the point clouds in a three-dimensional space obtained from the sensing devices 100, the server 200 may receive identification information from each of the sensing devices 100 or generate identification information corresponding to each of the sensing devices 100 and store, in the server 200, the identification information to correspond to the obtained point clouds in a three-dimensional space. The server 200 may have a lookup table stored by matching the identification information of the sensing devices 100 with the location of the sensing devices 100. The server 200 may identify sensing devices adjacent to each other by using the identification information of the sensing devices 100.

Figure 4:
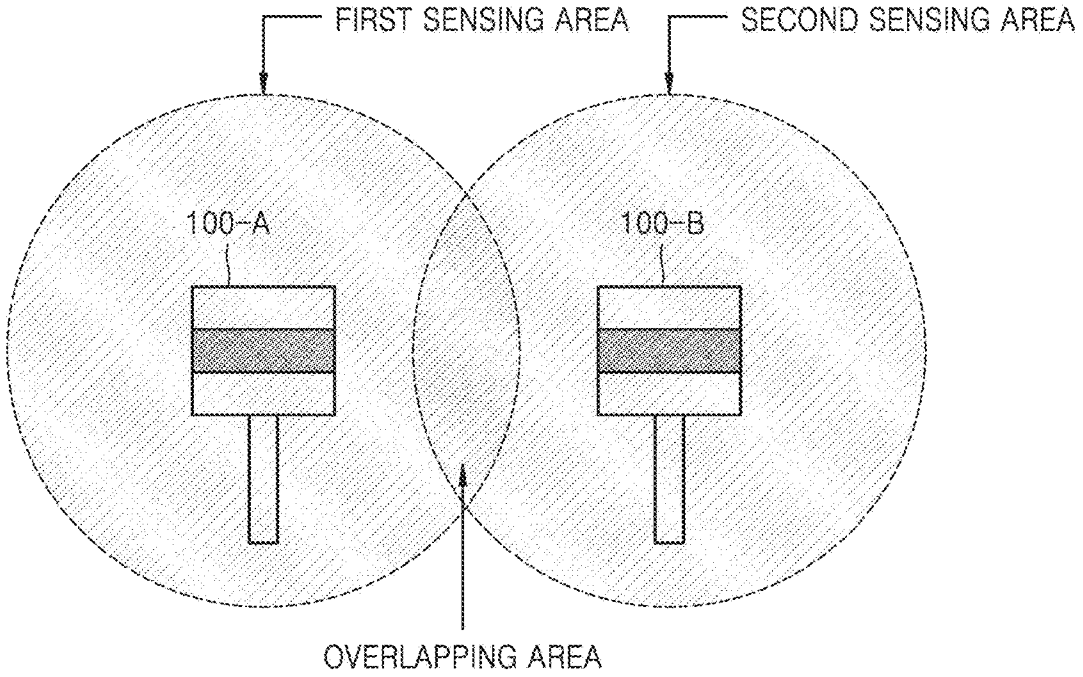
FIG. 4 is a view for explaining a sensing area and an overlapping area of each of sensing devices adjacent to each other.

FIG. 4 is a view for explaining sensing areas and an overlapping area of the sensing devices 100 adjacent to each other.

As illustrated in FIG. 4, a first sensing device 100-A may obtain a point cloud in a three-dimensional space in a first sensing area, and a second sensing device 100-B may obtain a point cloud in a three-dimensional space in second sensing area. The first sensing device 100-A and the second sensing device 100-B may each have a certain viewing angle and a sensing limit distance according to the type of a sensor, and thus, a sensing area for detecting an object in a three-dimensional space may be determined. The first sensing device 100-A and the second sensing device 100-B may be used to monitor objects in the first sensing area and the second sensing area, respectively.

Like the first sensing device 100-A and the second sensing device 100-B which are arranged adjacent to each other, an overlapping area may exist between the first sensing area corresponding to the first sensing device 100-A and the second sensing area corresponding to the second sensing device 100-B. In order to thoroughly monitor the entire space to be monitored, the sensing devices 100 adjacent to each other may be installed at positions where an overlapping area is generated between the sensing areas.

The first sensing device 100-A may transmit a point cloud in a three-dimensional space in the first sensing area to the server 200. The second sensing device 100-B may transmit a point cloud in a three-dimensional space in the second sensing area to the server 200. The server 200 may obtain the respective point clouds in a three-dimensional space from the first sensing device 100-A and the second sensing device 100-B adjacent to each other.

Figure 5:
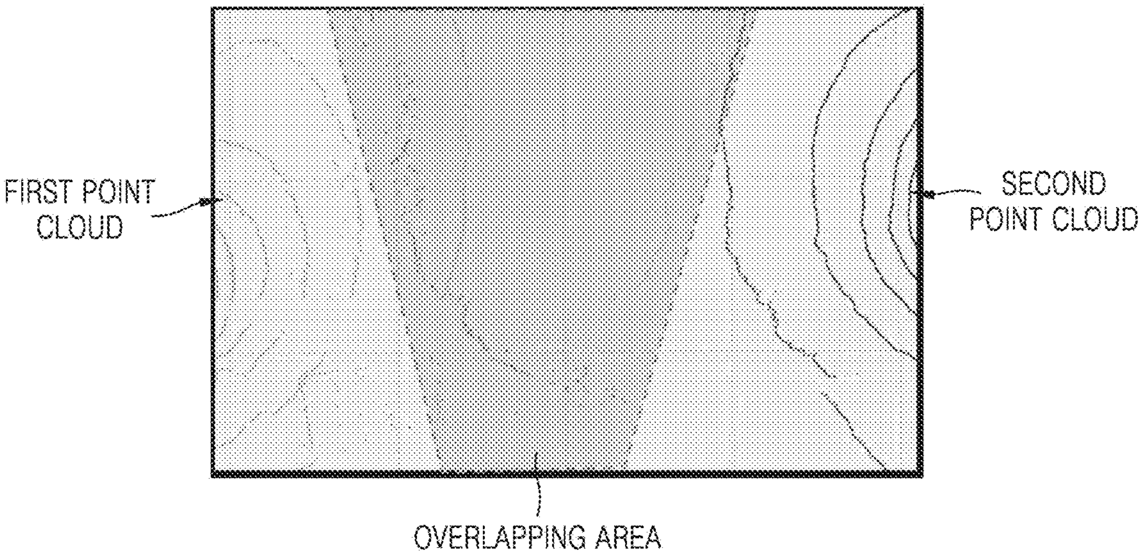
FIG. 5 is a view for explaining an overlapping portion between a first point cloud and a second point cloud corresponding to a predetermined reference surface, respectively obtained by sensing devices adjacent to each other.

FIG. 5 is a view for explaining an overlapping portion between a first point cloud and a second point cloud corresponding to a predetermined reference surface, respectively obtained by sensing devices adjacent to each other.

The server 200 may align the point clouds in a three-dimensional spaces obtained from the sensing devices adjacent to each other, based on the location of each of the sensing devices 100, the approximate shapes of the point clouds, and the like. Referring to FIG. 5, it is shown that the aligned shape of the first point cloud and the second point cloud corresponding to a predetermined reference surface obtained by the server 200 through the sensing devices adjacent to each other. When the two aligned point clouds are viewed from a perspective in a direction perpendicular to the predetermined reference surface, it is confirmed that there is an overlapping portion between two point clouds in an overlapping area, and there appears to be no problem with the alignment between the two point clouds.

Figure 6:
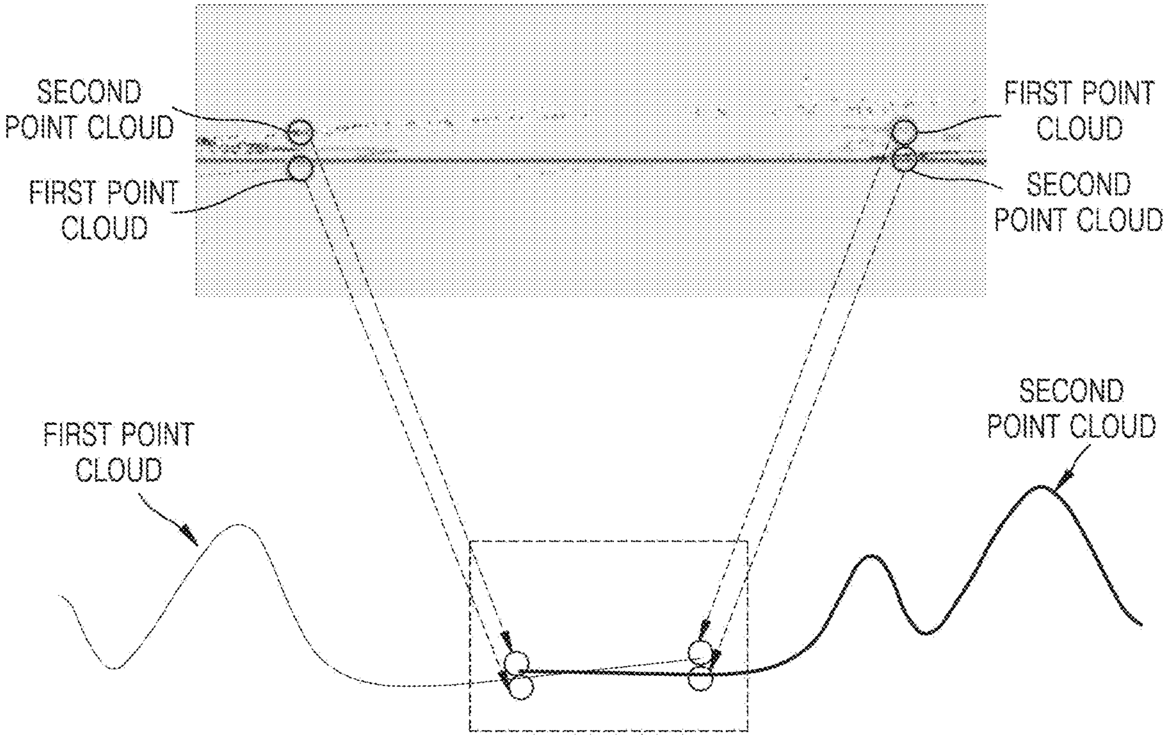
FIG. 6 is a view for explaining an error occurring in an overlapping portion between a first point cloud and a second point cloud.

FIG. 6 is a view for explaining an error occurring in the overlapping portion between the first point cloud and the second point cloud.

Referring to FIG. 6, the two aligned point clouds shown above in FIG. 5 viewed from a perspective in a lateral direction of the predetermined reference surface are shown. When the two aligned point clouds are viewed from a perspective in the lateral direction of the predetermined reference surface, it may be seen that there is an error between the two aligned point clouds. When seeing the overlapping portion between the first point cloud and the second point cloud, the point clouds corresponding to each other need to be congruous with each other, but it may be seen that, as illustrated in FIG. 6, two point clouds corresponding to each other in the first point cloud and the second point cloud are not accurately congruous with each other, and a separation occurs between the two point clouds.

When it is confirmed that there is a separation greater than or equal to a predetermined reference between point clouds corresponding to a predetermined reference surface in the overlapping portion of the two point clouds obtained by the adjacent sensing devices, matching of the point clouds in a three-dimensional space is inaccurate. When the matching between the point clouds in a three-dimensional space is inaccurate, a service using the same also becomes inaccurate so as not to be provided to a user. A method of matching point clouds in a three-dimensional space to address this problem is described below in detail.

Referring back to FIG. 3, the processor 220 of an example of the above configuration, by executing the one or more instructions stored in the memory 210, may obtain a first point cloud and a second point cloud corresponding to a predetermined reference surface in each of sensing devices adjacent to each other from among the plurality of sensing devices 100. For example, the processor 220 may obtain a first point cloud and a second point cloud corresponding to a predetermined reference surface, by extracting a point cloud corresponding to a predetermined reference surface from a point cloud in a three-dimensional space received from each of the sensing devices adjacent to each other. In another example, the processor 220 may receive a first point cloud and a second point cloud corresponding to a predetermined reference surface from each of the sensing devices adjacent to each other.

The predetermined reference surface may be the ground, but the disclosure is not limited thereto. When the predetermined reference surface is an indoor space, the predetermined reference surface may be the floor of a space where the sensing devices 100 is installed. The predetermined reference surface may be a plane, but the disclosure is not necessarily limited to the plane. For convenience of explanation, an assumption that the predetermined reference surface is the ground is described below.

The processor 220 may distinguish a point cloud corresponding to the ground, by applying point clouds in a three-dimensional space to an object classification model, or clustering point clouds in a three-dimensional space. The processor 220 may first distinguish a point cloud corresponding to the ground from the point clouds in a three-dimensional space, and other point clouds as point clouds corresponding to at least one object. The processor 220 may employ stochastic model-based fitting to search for a ground estimation model. The processor 220 may learn a ground shape in real time, and may classify the point clouds in a three-dimensional space based on whether a point cloud corresponds to the ground.

The processor 220 may align the first point cloud and the second point cloud corresponding to the predetermined reference surface based on a predetermined perspective, and identify an overlapping portion between the aligned first and second point clouds.

Figure 7:
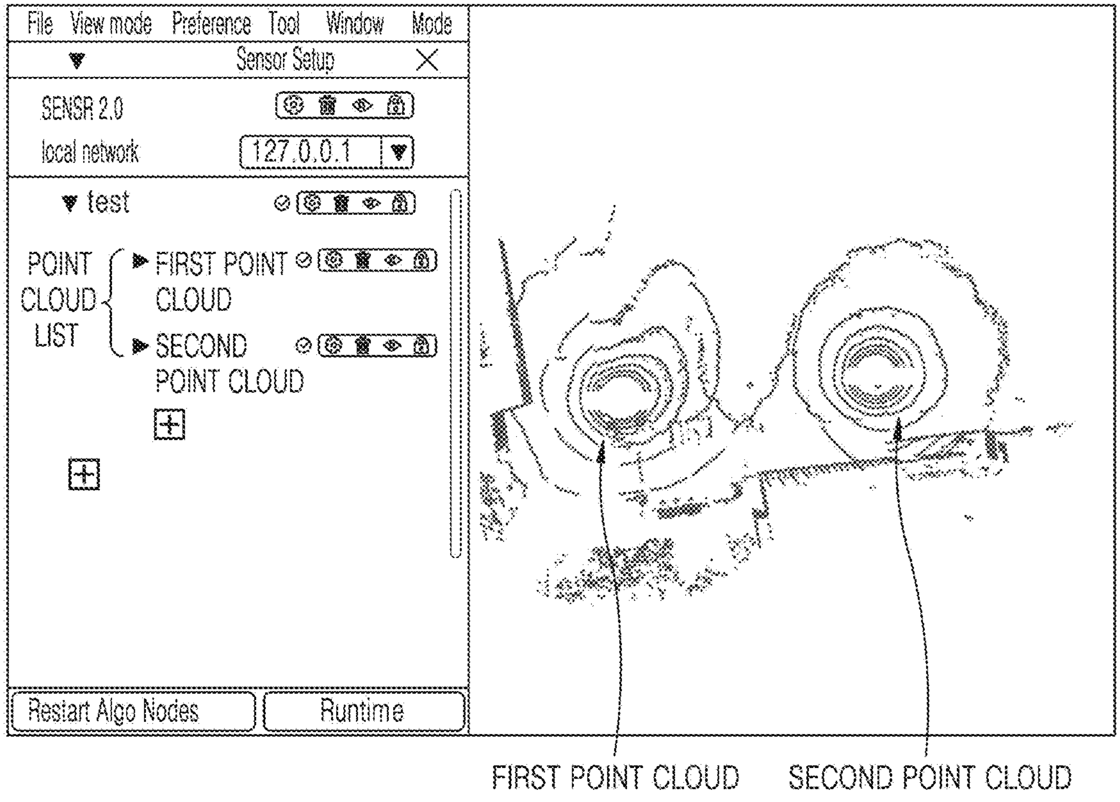
FIG. 7 is a view showing that first and second point clouds corresponding to a predetermined reference surface are aligned based on a predetermined perspective.

FIG. 7 is a view showing that first and second point clouds corresponding to a predetermined reference surface are aligned based on a predetermined perspective.

The processor 220 may align two point clouds by fixing any one of the two point clouds to be matched with each other and then appropriately arranging the other point cloud. For example, the processor 220 may fix a first point cloud and translate or rotate a second point cloud from a top view perspective, so as to arrange the second point cloud to fit to the fixed first point cloud until an overlapping portion reaches a predetermined reference or more.

The operation may be automatically performed by the processor 220 or performed according to a user's input. For example, a service provider or manager may, by performing a computer program or application to match point clouds in a three-dimensional space, display a first point cloud and a second point cloud corresponding to a predetermined reference surface on a user interface screen, as illustrated in FIG. 7. Point clouds to be matched with each other may be added to or deleted from a point cloud list through a menu in the user interface screen. The service provider or manager fixes any one point cloud and translate or rotates the other point cloud from a top view perspective, thereby arranging the other point cloud to fit to the fixed point cloud.

However, when two point clouds are aligned based on a predetermined perspective, as described above in FIG. 6, when viewed from another perspective, the two point clouds may not be appropriately matched with each other. To address the matter, the following process of accurately matching point clouds in a three-dimensional space by generating a regression model formed with predetermined reference points in each point cloud and performing a fine adjustment for matching between regression models, may be added.

Referring back to FIG. 3, the processor 220 may obtain first reference points belonging to a first point cloud in an overlapping portion between the first point cloud and the second point cloud corresponding to a predetermined reference surface. This is to generate a first regression model formed with first reference points in the first point cloud.

Figure 8:
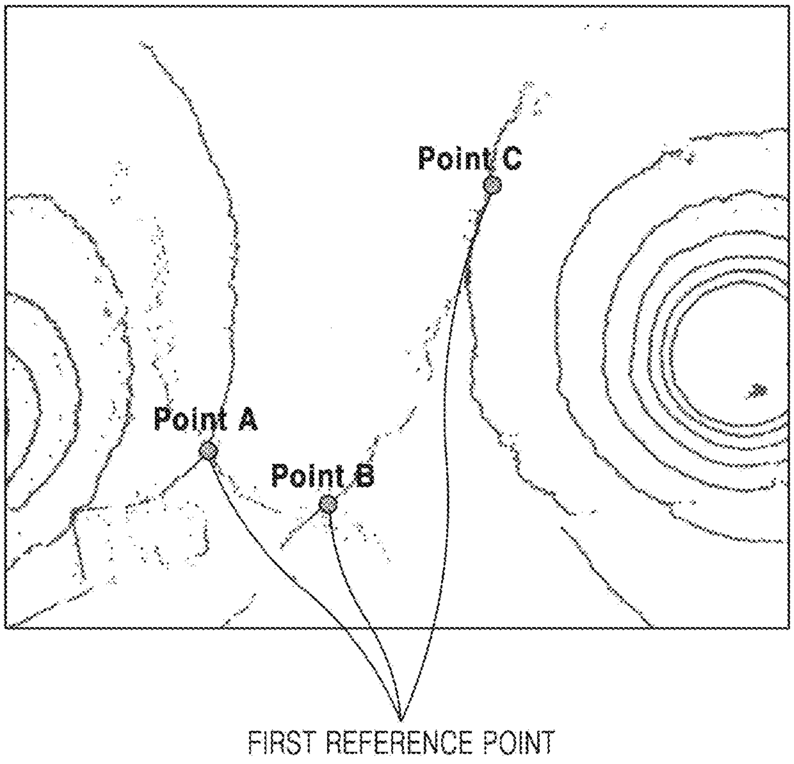
FIG. 8 is a view for explaining a process of obtaining first reference points belonging to a first point cloud in an overlapping portion between a first point cloud and a second point cloud.

FIG. 8 is a view for explaining a process of obtaining first reference points belonging to a first point cloud in an overlapping portion between a first point cloud and a second point cloud.

The processor 220 may select first reference points belonging to the first point cloud from among the points in the overlapping portion between the aligned first and second point clouds. For example, the processor 220 may select, as first reference points, at least three points belonging to the first point cloud from among the points in the overlapping portion.

Such an operation may be automatically performed by the processor 220 or may be performed according to a user's input. For example, the service provider or manager may select, as first reference points (Point A, Point B, and Point C), at least three points belonging to the first point cloud from among the points in the overlapping portion between the first point cloud and the second point cloud, as illustrated in FIG. 8, through a computer program or application for matching point clouds in a three-dimensional space.

When the first reference points are determined, the processor 220 may determine a first regression model formed with first reference points. A regression model may be generated through regression using reference points, and may be represented in the form of a certain equation or meta function. For example, the first regression model may be a plane formed with first reference points and may be represented by a plane equation. In other words, the processor 220 may specify a first regression model and generate an equation for defining the first regression model.

Referring back to FIG. 3, the processor 220 may obtain second reference points corresponding to the obtained first reference points, in the second point cloud adjacent to the first point cloud. This is to generate a second regression model formed with second reference points in the second point cloud.

Figure 9:
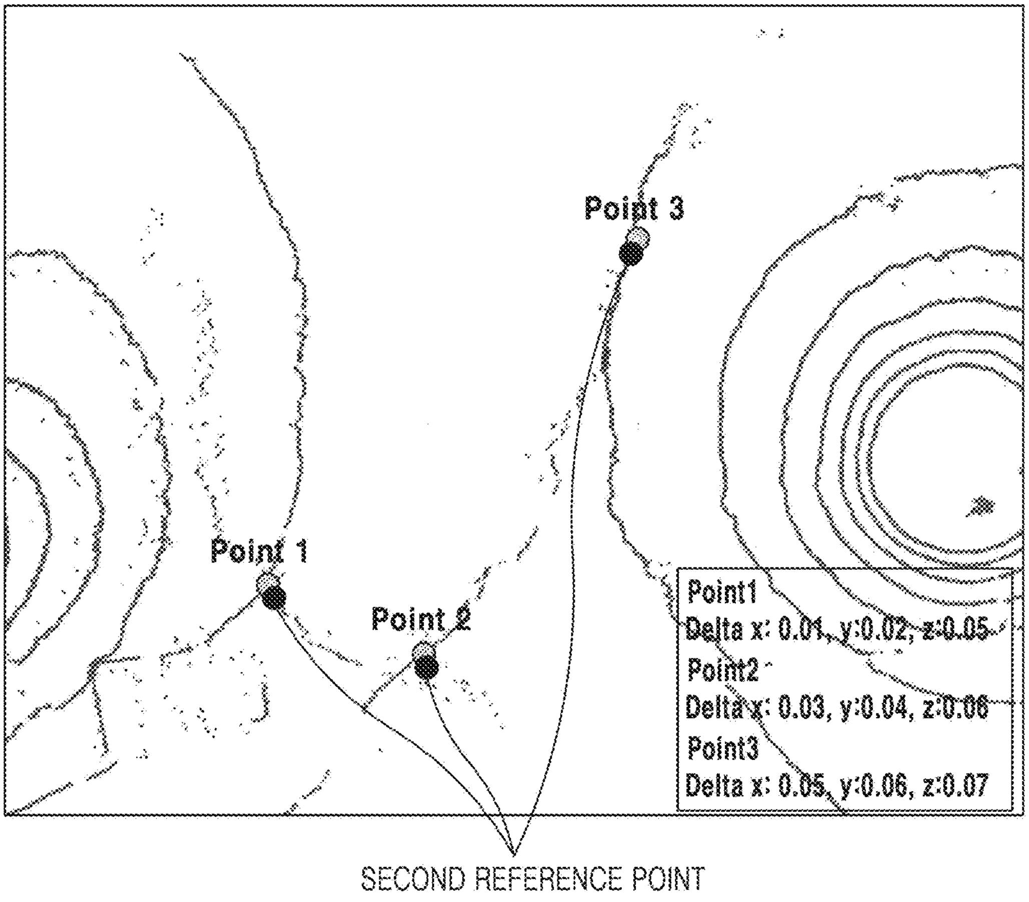
FIG. 9 is a view for explaining a process of obtaining second reference points corresponding to first reference points.

FIG. 9 is a view for explaining a process of obtaining second reference points corresponding to first reference points.

The processor 220 may select second reference points belonging to the second point cloud from among the points in the overlapping portion between the aligned first and second point clouds. For example, as illustrated in FIG. 9, the processor 220 may obtain points respectively closest to the obtained first reference points from among the points in the overlapping portion, as second reference points (Point 1, Point 2, and Point 3). The processor 220 may provide to the service provider or manager a result of the selection of the second reference points (Point 1, Point 2, and Point 3) from the second point cloud through the user interface screen.

Such an operation may be automatically performed by the processor 220 or may be performed according to a user's input. For example, the service provider or manager may select, as second reference points, at least three points belonging to the second point cloud from among the points in the overlapping portion between the first point cloud and the second point cloud, through a computer program or application for matching point clouds in a three-dimensional space. In order for the service provider or manager to select second reference points well, the processor 220 may recommend points appropriate for the second reference points from the second point cloud, through the user interface screen, to service provider or manager.

When the second reference points are determined, the processor 220 may determine a second regression model formed with second reference points. For example, the second regression model may be a plane formed with second reference points and may be represented by a plane equation. In other words, the processor 220 may specify a second regression model, and may generate an equation for defining the second regression model.

The regression model is not limited to the form of a plane, and in the following description, for convenience of explanation, a case of the regression model being a plane is described as an example.

Referring back to FIG. 3, the processor 220 may match the first point cloud with the second point cloud to minimize an error between the first regression model formed with the obtained first reference points and the second regression model formed with the obtained second reference points. To this end, while moving the second regression model toward the first regression model, a position where the error between the first regression model and the second regression model is minimized may be obtained.

For example, the processor 220 may match the first point cloud with the second point cloud based on a conversion matrix used to move a second plane to a position where a loss function is minimized, the loss function corresponding to the sum of distances between point clouds included in a first plane that is a first regression model and corresponding point clouds included in a second plane that is a second regression model.

In another example, the processor 220 may match the first point cloud with the second point cloud based on a conversion matrix to move a normal vector at at least one coordinates of a second plane that is a second regression model to a position where the normal vector matches a normal vector at coordinates corresponding to a first plane that is a first regression model.

Figure 10:
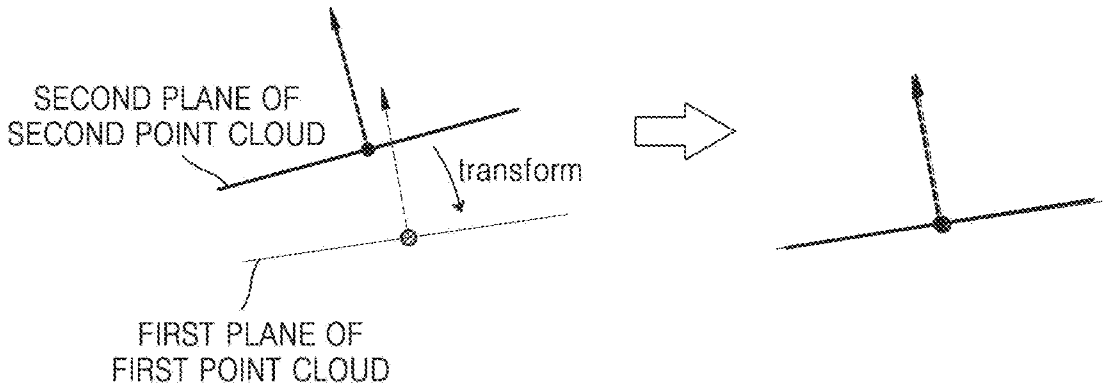
FIG. 10 is a view for explaining an example of a process of matching a first plane formed with first reference points with a second plane formed with second reference points.

FIG. 10 is a view for explaining an example of a process of matching a first plane formed with first reference points with a second plane formed with second reference points.

The processor 220 may obtain predetermined coordinates and a normal vector at the corresponding coordinates from each of the first plane that is a first regression model formed with first reference points belonging to a first point cloud and the second plane that is a second regression model formed with second reference points belonging to a second point cloud. The predetermined coordinates may be coordinates of the center of gravity and may include one or more coordinates.

The processor 220 may match the first point cloud with the second point cloud based on a conversion matrix used to move a normal vector at predetermined coordinates of the second plane to a position where the normal vector matches a normal vector at corresponding coordinates of the first plane.

Figure 11:
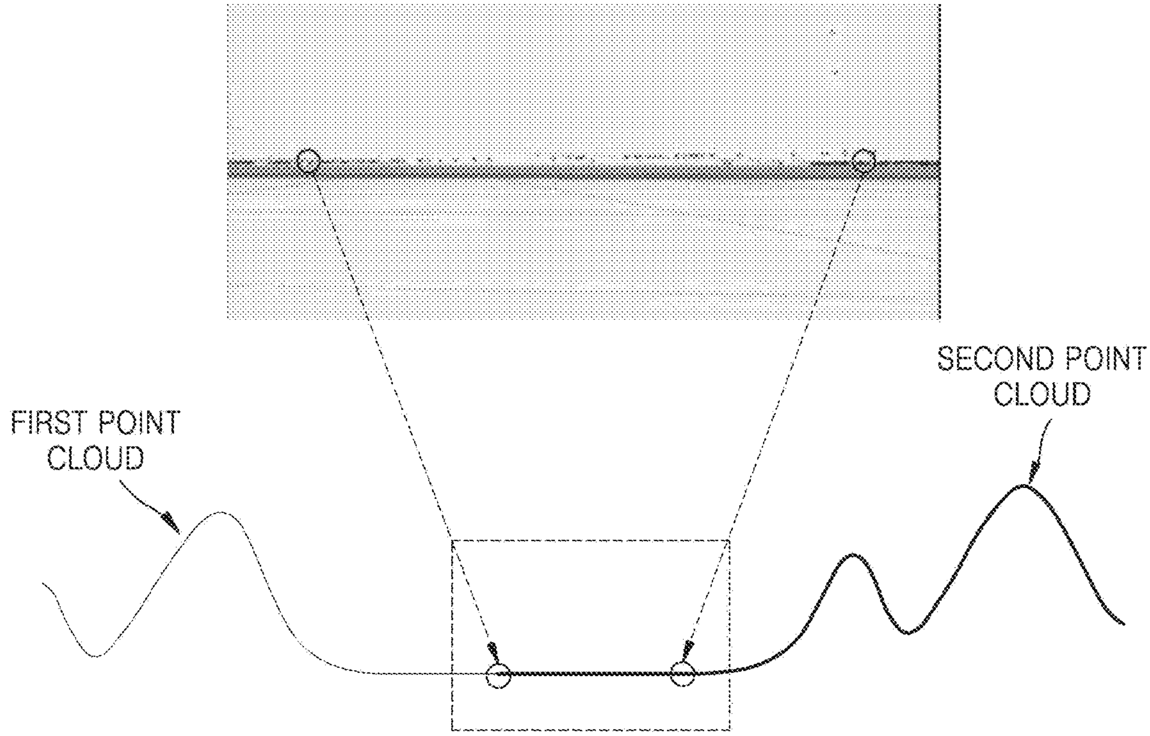
FIG. 11 is a view for explaining a result in which an error occurring in an overlapping portion between a first point cloud and a second point cloud is minimized.

FIG. 11 is a view for explaining a result in which an error occurring in an overlapping portion between a first point cloud and a second point cloud is minimized.

According to the method described above, when a first plane and a second plane are matched with each other to minimize the error between the first plane formed with first reference points belonging to a first point cloud and the second plane formed with second reference points belonging to a second point cloud, the first point cloud and the second point cloud are accurately matched with each other. Through the accurate matching between the first point cloud and the second point cloud corresponding to a predetermined reference surface, the entire point clouds in a three-dimensional space obtained from the adjacent sensing devices may be accurately matched with each other.

As illustrated in FIG. 11, it may be seen that the error between the first point cloud and the second point cloud is minimized when a first point cloud and a second point cloud corresponding to a predetermined reference surface on which a first plane and a second plane are matched with each other is seen from a perspective in a lateral direction of the predetermined reference surface. It may be seen that, in the overlapping portion between the first point cloud and the second point cloud, there is consistency in the corresponding point clouds. When the matching between point clouds in a three-dimensional space is accurate, a service using the same may become accurate, and a quality service may be provided to a user.

Figure 12:
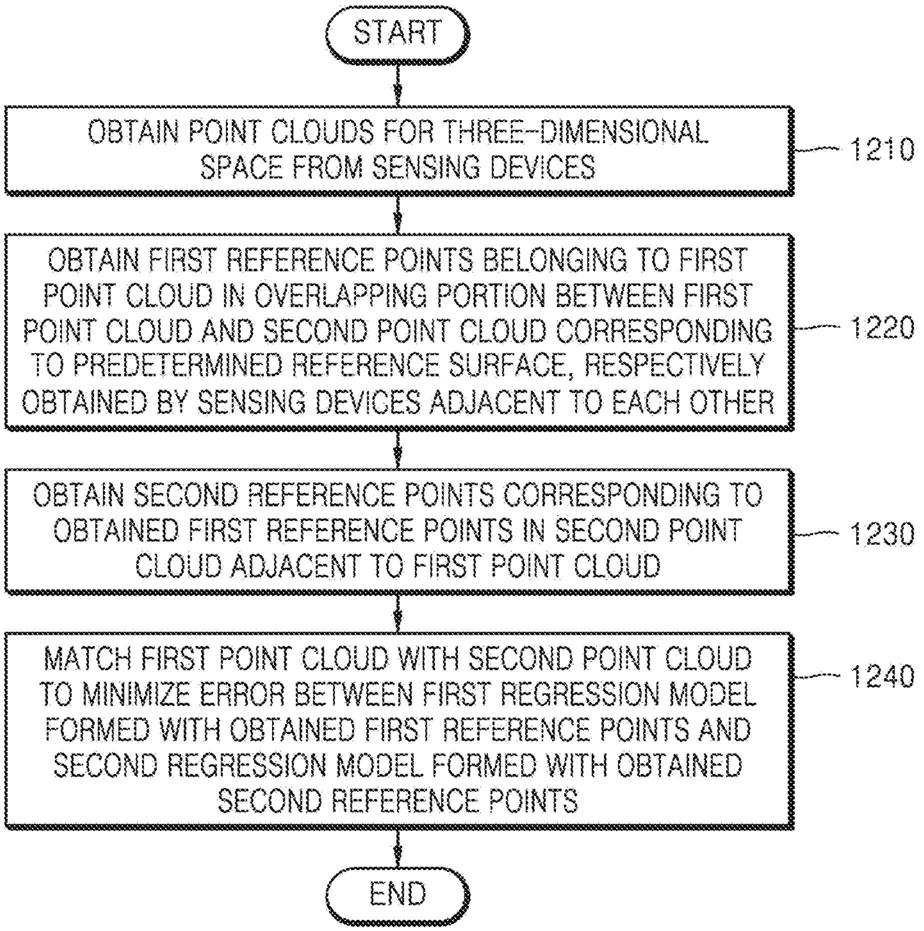
FIG. 12 is a flowchart for explaining a method of matching point clouds in a three-dimensional space, according to an embodiment.

FIG. 12 is a flowchart for explaining a method of matching point clouds in a three-dimensional space, according to an embodiment. The descriptions of the server 200 presented above may be applied, without change, though omitted below, to the description of a method of matching point clouds in a three-dimensional space.

In operation 1210, the server 200 obtains point clouds in a three-dimensional space from the plurality of sensing devices 100.

In operation 1220, the server 200 obtains first reference points belonging to a first point cloud in an overlapping portion between a first point cloud and a second point cloud corresponding to a predetermined reference surface, respectively obtained by sensing devices adjacent to each other from among the plurality of sensing devices 100.

First, the server 200 may align the first point cloud and the second point cloud based on a predetermined perspective. The server 200 may fix the first point cloud and translate or rotate the second point cloud from a predetermined perspective, for example, a top view perspective, so as to arrange the second point cloud to fit to the fixed first point cloud until the overlapping portion reaches a predetermined reference or more.

Next, the server 200 may select first reference points belonging to the first point cloud from among the points in the overlapping portion between the aligned first and second point clouds. In this state, the server 200 may select, as first reference points, at least three points belonging to the first point cloud from among the points in the overlapping portion.

In operation 1230, the server 200 obtains second reference points corresponding to the obtained first reference points in the second point cloud adjacent to the first point cloud. The server 200 may obtain points respectively closest to the obtained first reference points from among the points in the overlapping portion, as second reference points.

In operation 1240, the server 200 matches the first point cloud with the second point cloud to minimize an error between a first regression model formed with the obtained first reference points and a second regression model formed with the obtained second reference points.

For example, the server 200 may match the first point cloud with the second point cloud based on a conversion matrix used to move a second regression model to a position where a loss function is minimized, the loss function corresponding to the sum of distances between point clouds included in the first regression model and corresponding point clouds included in the second regression model.

In another example, the server 200 may match the first point cloud with the second point cloud based on a conversion matrix used to move a normal vector at predetermined coordinates of a second regression model to a position where the normal vector matches a normal vector at corresponding coordinates of a first regression model.

Through the accurate matching between the first point cloud and the second point cloud corresponding to a predetermined reference surface, the entire point clouds in a three-dimensional space obtained from the adjacent sensing devices may be accurately matched with each other.

Each of the embodiments described above may be provided in the form of a computer program or an application stored in a medium, to perform predetermined operations to perform a method of matching point clouds in a three-dimensional space. In other words, each of the embodiments described above may be provide in the form of a computer program or an application stored in a medium, to perform, by at least one processor of the server 200, predetermined operations of a method of matching point clouds in a three-dimensional space.

The above-described embodiments may be implemented in the form of a computer-readable storage medium that stores instructions and data executable by a computer or processor. At least one of the instructions and data may be stored in the form of program code, and when executed by a processor, may generate a predetermined program module and perform a predetermined operation. The computer-readable storage medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks (SSDs), and any devices capable of providing instructions or software, associated data, data files, and data structures to a processor or computer so as to execute the instructions.

While this disclosure has been particularly shown and described with reference to preferred embodiments thereof, it will be understood by those of ordinary skill in the art that various changes in form and details may be made therein without departing from the spirit and scope of the disclosure as defined by the appended claims. The preferred embodiments should be considered in descriptive sense only and not for purposes of limitation. Therefore, the scope of the disclosure is defined not by the detailed description of the disclosure but by the appended claims, and all differences within the scope will be construed as being included in the disclosure.

What is claimed is:

1. A method, performed by a server, of matching point clouds in a three-dimensional space, the method comprising:

obtaining point clouds in the three-dimensional space from a plurality of sensing devices;

obtaining identification information of each of the plurality of sensing devices;

storing, in the server, a lookup table associating the identification information with location information of the plurality of sensing devices;

identifying sensing devices of the plurality of sensing devices that are adjacent to each other based on the identification information and the location information stored in the lookup table;

obtaining a first point cloud and a second point cloud respectively from the sensing devices identified as being adjacent to each other;

aligning the first point cloud and the second point cloud in the three-dimensional space based on locations and approximate shapes of the first and second point clouds such that an overlapping portion is formed between the first point cloud and the second point cloud;

obtaining three or more first reference points belonging to the first point cloud in the overlapping portion corresponding to a predetermined reference surface;

obtaining three or more second reference points belonging to the second point cloud in the overlapping portion such that the three or more second reference points are respectively closest to the three or more first reference points; and matching the first point cloud with the second point cloud to minimize an error between a first regression model formed with the obtained first reference points and a second regression model formed with the obtained second reference points.

2. The method of claim 1, wherein the aligning comprises, by fixing the first point cloud and translating and rotating the second point cloud from a top view perspective, arranging the second point cloud to fit to the fixed first point cloud until the overlapping portion reaches a predetermined reference or more.

3. The method of claim 1, wherein the matching comprises matching the first point cloud with the second point cloud based on a conversion matrix used to move the second regression model to a position where a loss function is minimized, the loss function corresponding to a sum of distances between point clouds included in the first regression model and corresponding point clouds included in the second regression model.

4. The method of claim 1, wherein the matching comprises matching the first point cloud with the second point cloud based on a conversion matrix used to move a normal vector at predetermined coordinates of the second regression model to a position where the normal vector matches a normal vector at corresponding coordinates of the first regression model.

5. A non-transitory computer-readable storage medium storing instructions, when executed by one or more processors, configured to cause the one or more processors to perform the method of claim 1.

6. The method of claim 1, wherein the three or more first reference points and the three or more second reference points respectively partially overlap each other.

7. The method of claim 1, wherein the three or more first reference points and the three or more second reference points are selected from points corresponding to the predetermined reference surface within the overlapping portion, and wherein matching the first point cloud with the second point cloud is performed using only the selected first reference points and the selected second reference points.

8. The method of claim 1, wherein the first regression model and the second regression model are formed as planar models corresponding to the predetermined reference surface.

9. A server for matching point clouds in a three-dimensional space, the server comprising:

a communication interface configured to obtain point clouds in the three-dimensional space from a plurality of sensing devices;

a memory storing one or more instructions; and a processor configured to execute the one or more instructions to:

obtain identification information of each of the plurality of sensing devices;

store a lookup table associating the identification information with location information of the plurality of sensing devices;

identify sensing devices of the plurality of sensing devices that are adjacent to each other based on the identification information and the location information stored in the lookup table;

obtain a first point cloud and a second point cloud respectively from the sensing devices identified as being adjacent to each other;

align the first point cloud and the second point cloud in the three-dimensional space based on locations and approximate shapes of the first and second point clouds such that an overlapping portion is formed between the first point cloud and the second point cloud;

obtain three or more first reference points belonging to the first point cloud in the overlapping portion corresponding to a predetermined reference surface;

obtain three or more second reference points belonging to the second point cloud in the overlapping portion such that the three or more second reference points are respectively closest to the three or more first reference points; and match the first point cloud with the second point cloud to minimize an error between a first regression model formed with the obtained first reference points and a second regression model formed with the obtained second reference points.

10. The server of claim 9, wherein the processor is further configured to by fixing the first point cloud and translating and rotating the second point cloud from a top view perspective, arrange the second point cloud to fit to the fixed first point cloud until the overlapping portion reaches a predetermined reference or more.

11. The server of claim 9, wherein the processor is further configured to match the first point cloud with the second point cloud based on a conversion matrix used to move the second regression model to a position where a loss function is minimized, the loss function corresponding to the sum of distances between point clouds included in the first regression model and corresponding point clouds included in the second regression model.

12. The server of claim 9, wherein the processor is further configured to match the first point cloud with the second point cloud based on a conversion matrix used to move a normal vector at predetermined coordinates of the second regression model to a position where the normal vector matches a normal vector at corresponding coordinates of the first regression model.

* * * * *